(12) United States Patent
Birkenes et al.

(10) Patent No.: US 10,267,912 B1
(45) Date of Patent: Apr. 23, 2019

(54) AUDIO BASED MOTION DETECTION IN SHARED SPACES USING STATISTICAL PREDICTION

(71) Applicant: Cisco Technology, Inc., San Jose, CA (US)

(72) Inventors: Øystein Birkenes, Oslo (NO); Lennart Burenius, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/981,318

(22) Filed: May 16, 2018

(51) Int. Cl.
*G01S 15/04* (2006.01)
*G10K 11/178* (2006.01)
(Continued)

(52) U.S. Cl.
CPC ............. *G01S 15/04* (2013.01); *G01S 7/524* (2013.01); *G01S 7/526* (2013.01); *G01S 7/5273* (2013.01); *G01S 15/003* (2013.01); *G01S 15/02* (2013.01); *G01S 15/06* (2013.01); *G01S 15/42* (2013.01); *G01S 15/46* (2013.01); *G01S 15/50* (2013.01); *G01S 15/52* (2013.01); *G01S 15/523* (2013.01); *G01S 15/58* (2013.01); *G01S 15/62* (2013.01); *G01S 15/87* (2013.01); *G01S 15/876* (2013.01); *G01S 15/878* (2013.01); *G10K 11/17825* (2018.01); *G10K 11/17854* (2018.01)

(58) Field of Classification Search
CPC .......... G01S 15/02; G01S 15/04; G01S 15/06; G01S 15/42; G01S 15/46; G01S 15/50; G01S 15/52; G01S 15/523; G01S 15/58; G01S 15/62; G01S 15/87; G01S 15/876; G01S 15/878; G01S 7/524; G01S 7/526
See application file for complete search history.

(56) References Cited

U.S. PATENT DOCUMENTS 6,307,811 B1 * 10/2001 Luber ................... G01S 15/105
340/4.2
8,907,929 B2 12/2014 Li et al.
(Continued)

FOREIGN PATENT DOCUMENTS

WO 2017196991 A1 11/2017

OTHER PUBLICATIONS

Shih, et al., "Occupancy Estimation using Ultrasonic Chips", Electrical and Computer Engineering, Carnegie Mellon University, Aug. 16, 2015, 10 pgs.
(Continued)

*Primary Examiner* — Andrew W Bee
(74) *Attorney, Agent, or Firm* — Edell, Shapiro & Finnan, LLC

(57) ABSTRACT

An endpoint among a plurality of endpoints, synchronizes a clock across the plurality of endpoints. The endpoint generates a received ultrasonic signal by transducing ultrasonic sound received at a microphone from a spatial region. The ultrasonic sound includes an identical ultrasonic signal transmitted from the plurality of endpoints and echoes from the spatial region. The identical ultrasonic signal is generated with respect to the synchronized clock. The endpoint computes an error signal based on removing the identical ultrasonic signals and the echoes from the received ultrasonic signal. The endpoint detects motion in the spatial region based on a change in the error signal over time.

20 Claims, 4 Drawing Sheets

(51) Int. Cl.

| | |
|---|---|
| *G01S 7/527* | (2006.01) |
| *G01S 15/00* | (2006.01) |
| *G01S 15/52* | (2006.01) |
| *G01S 15/58* | (2006.01) |
| *G01S 15/42* | (2006.01) |
| *G01S 7/524* | (2006.01) |
| *G01S 15/46* | (2006.01) |
| *G01S 15/62* | (2006.01) |
| *G01S 7/526* | (2006.01) |
| *G01S 15/50* | (2006.01) |
| *G01S 15/87* | (2006.01) |
| *G01S 15/06* | (2006.01) |
| *G01S 15/02* | (2006.01) |

(56) References Cited

U.S. PATENT DOCUMENTS

| | | | |
|---|---|---|---|
| 9,025,762 | B2 | 5/2015 | Bao et al. |
| 9,319,633 | B1 | 4/2016 | Birkenes et al. |
| 2008/0232608 | A1* | 9/2008 | Ullmann ............... G01S 15/04 381/77 |
| 2014/0122018 | A1* | 5/2014 | Sundholm ............ B66B 1/2408 702/150 |
| 2015/0036848 | A1 | 2/2015 | Donaldson |
| 2015/0331093 | A1* | 11/2015 | Pandharipande .. H05B 37/0227 367/93 |
| 2015/0338510 | A1* | 11/2015 | Pandharipande .. H05B 33/0815 367/93 |

OTHER PUBLICATIONS

Sabatier, et al., "Ultrasonic Methods for Human Motion Detection", NATO OTAN, Unclassified/Unlimited, The University of Mississippi, National Center for Physical Acoustics, R&T Organization, Battlefield Acoustic Sensing for ISR Applications, Oct. 2006, 30 pgs.

Ekimov, et al., "Human motion analyses using footstep ultrasound and Doppler ultrasound", National Center for Physical Acoustics, The University of Mississippi, DOI: 10,1121/1.2908823, Acoustical Society of America EL 149, May 14, 2008, 6 pgs.

Zungeru, "Design and Development of an Ultrasonic Motion Detector", School of Electrical and Electronic Engineering, University of Nottingham, Mar. 7, 2013, 13 pgs.

Bao, et al., "Using an Ultrasound Signal for Clock and Timing Synchronization for Acoustic Echo Cancellation with Multiple Teleconference Devices in the Same Room", IP.com, Cisco Systems, Inc., Aug. 24, 2016, 16 pgs.

* cited by examiner

US 10,267,912 B1

AUDIO BASED MOTION DETECTION IN SHARED SPACES USING STATISTICAL PREDICTION

TECHNICAL FIELD

The present disclosure relates to motion detection based on a plurality of audio signal sources.

BACKGROUND

Collaboration endpoints are generally used for multimedia meetings. These endpoints may include cameras, displays, microphones, speakers, and other equipment configured to facilitate multimedia meetings. Endpoint equipment often remains activated for long periods of time even when the equipment is only used intermittently for multimedia meetings.

Ultrasonic motion detectors may be used to automatically sleep or wake a collaboration endpoint. When no motion is detected, the endpoint may enter a standby mode to save power and increase the life expectancy of components of the endpoint, such as image sensors. If a person enters the room, the ultrasonic motion detector may detect motion and wake the endpoint from the standby mode and display a friendly and informative greeting.

DESCRIPTION OF EXAMPLE EMBODIMENTS

Overview

Figure 1:
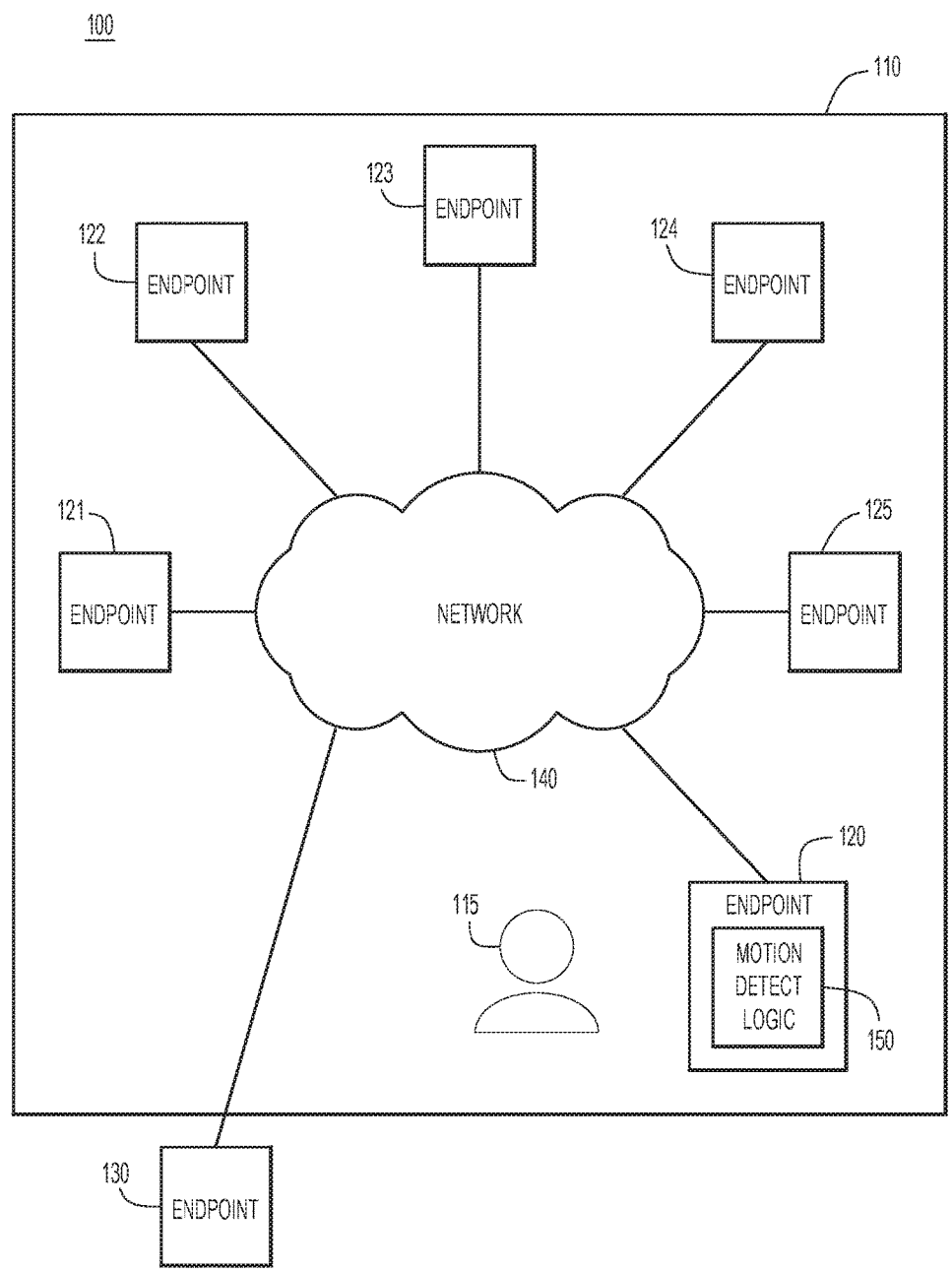
FIG. 1 is a simplified block diagram of a plurality of endpoints with motion detection optimized for a crowded spatial region, according to an example embodiment.

A computer-implemented method comprises, at a first endpoint among a plurality of endpoints, synchronizing a clock across the plurality of endpoints. The method also comprises generating a received ultrasonic signal by transducing ultrasonic sound received at a microphone from a spatial region. The ultrasonic sound includes an identical ultrasonic signal transmitted from the plurality of endpoints and echoes from the spatial region. The identical ultrasonic signal is generated with respect to the synchronized clock. The method further comprises computing an error signal based on removing the identical ultrasonic signals and the echoes from the received ultrasonic signal. The method also comprises detecting motion in the spatial region based on a change in the error signal over time.

Example Embodiments

Ultrasonic-based motion detection may use statistical predictions to determine motion in a spatial region. In one example, a collaboration endpoint may emit a specific ultrasonic signal into the spatial region. A microphone on the endpoint receives any echoes/reflections of the ultrasonic signal and removes the echoes from the received ultrasonic signal with the use of an adaptive filter. Motion within the spatial region alters the echoes of the ultrasonic signal and causes the error signal of the adaptive filter to change. The detection of motion in the nearby spatial region may cause the endpoint to wake from a standby state, trigger alarms, and/or control lights/blinds. Additionally, data on room usage may be used to improve building planning or provide users with information on available meeting rooms.

Ultrasonic motion detection using statistical prediction may be complicated by multiple endpoints emitting interfering signals, such as in open office spaces or classrooms with multiple endpoints. Additionally, ultrasonic interference may leak into a meeting room from endpoints near an open door to the meeting room. The adaptive filter in each endpoint treats the ultrasonic signal from other endpoints as noise. As the number of ultrasonic signals from uncorrelated endpoints increases, the motion detection becomes less sensitive. For a small number of interfering endpoints, the endpoint may use separate microphones and adaptive filters to remove each interfering signal from the received ultrasonic signal. However, as the number of potentially interfering signals from different endpoints increases, the hardware requirements quickly becomes unreasonable.

The techniques presented herein increases the sensitivity of ultrasonic-based motion detection in the presence of interference, and even makes use of the other interfering signals to improve the motion detection. Initially, the audio sampling clock is synchronized across all of the endpoints in a particular spatial region. Each endpoint plays the same periodic ultrasonic signal, though the phase of the periodic signal is not necessarily synchronized across the endpoints. In other words, each of the endpoints transmits an identical ultrasonic signal, but each endpoint may begin the transmission at different points in time. Each endpoint runs a prediction-based motion detection system using a single-channel echo cancellation logic circuit. In other words, each endpoint only requires a single adaptive filter to remove both the echo from the ultrasonic signal transmitted by the endpoint and any other signals transmitted by other nearby endpoints.

Referring now to FIG. 1, a motion detection system 100 is configured to monitor a spatial region 110 and detect when a person 115 moves within the spatial region 110. Endpoints 120, 121, 122, 123, 124, and 125 are located within the spatial region 110. Additionally, one or more endpoints 130 may be located outside of the spatial region 110 but in close enough proximity that ultrasonic signals from the outside endpoint 130 leaks into the spatial region 110 (e.g., through an open door). Each of the endpoints 120, 121, 122, 123, 124, 125, and 130 are connected to a network 140 allowing communication between the endpoints. The network 140 may be a wired or wireless network, and may include one or more network elements (e.g., routers, switches, network controllers, etc.) to facilitate communication between the endpoints. Endpoint 120 includes motion detection logic 150, which enables the endpoint 120 to perform the techniques described herein.

In one example, a plurality of the endpoints 120, 121, 122, 123, 124, 125, and 130 synchronize their respective audio sampling clocks, e.g., using Precision Time Protocol (PTP). Synchronizing using PTP enables a clock accuracy across the plurality of endpoints in the sub-microsecond range. Other clock synchronization methods, such as Network Time Protocol (NTP) may only achieve sub-millisecond accuracy, which is not sufficient for the techniques described herein. Since the acoustic signal used in the motion detection system 100 is in the ultrasonic frequency range, clocks that vary in the sub-millisecond range allow for varying samples with a 48,000 Hz sampling frequency. In other words, the ultrasonic signal changes significantly within ⅟₄₈,₀₀₀ Hz, or approximately 21 microseconds, requiring a comparably high clock synchronization between remote clocks to capture a nominally identical signal.

Without explicit clock synchronization, variations between base hardware implementations of the endpoints 120, 121, 122, 123, 124, 125, and 130 may allow for up to a 100 parts per million variation in the sampling clock rate. This variation in the sampling clock rate may lead to the endpoint 120 sampling at an actual rate of 48,000 Hz, while the endpoint 121 samples the ultrasonic signal at an actual rate of 48,005 Hz. This difference in sampling rate would cause the two endpoints 120 and 121 to capture ultrasonic signals that are different enough that a single adaptive filter may not be able to process the two signals according to the techniques described herein.

In another example, a network administrator may configure which endpoints to synchronize, i.e., which endpoints work together for robust motion detection. For instance, the administrator may configure a group of nearby endpoints (e.g., endpoints 120, 121, and 125) in the same room (e.g., spatial region 110) to work together. Alternatively, all of the endpoints 120, 121, 122, 123, 124, 125, and 130 that are connected to the same Local Area Network (e.g., network 140) may be synchronized to work together. The administrator may tailor the decision on which endpoints to synchronize based on the application for the motion detection. For instance, in a large shared office space, the endpoints may be synchronized to enable the motion detection to control overhead lighting or alarms for the entire room rather than waking individual endpoints. In other words, the administrator may not want the motion detection system to wake individual endpoints from a standby state as a user walks past each of the endpoints on the way to the user's own endpoint.

Figure 2:
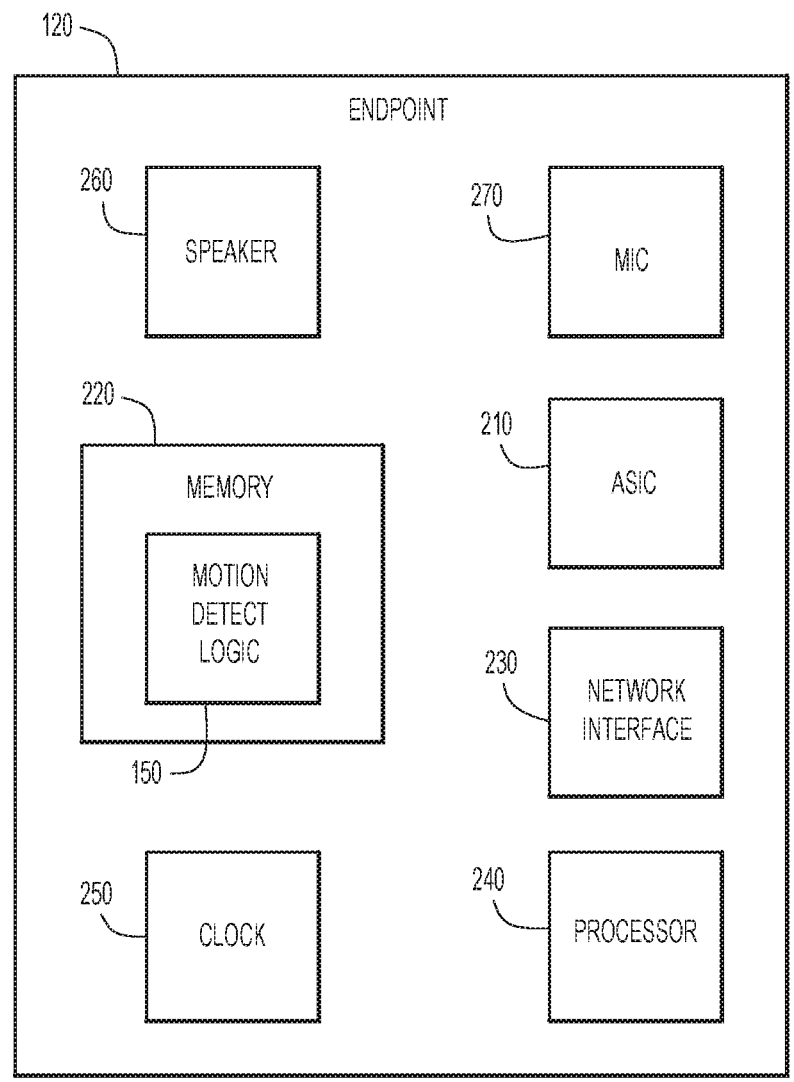
FIG. 2 is a simplified block diagram of an endpoint configured to operate motion detection techniques according to an example embodiment.

Referring now to FIG. 2, a simplified block diagram of an endpoint 120 configured to execute the techniques described herein is shown. The endpoint 120 may include one or more application specific integrated circuits (ASICs) 210, a memory 220, a network interface 230, one or more processors 240, one or more clocks 250, a speaker 260, and a microphone 270. The memory 220 stores or is encoded with motion detection logic 150. The one or more ASICs 210 may be customized for one or more particular uses (e.g., audio/video signal processing). The one or more processors 240 are configured to execute instructions stored in the memory 220 (e.g., motion detection logic 150). When executed by the one or more processors 240, the motion detection logic 150 enables the endpoint 120 to perform the operations described herein.

The memory 220 may include read only memory (ROM), random access memory (RAM), magnetic disk storage media devices, optical storage media devices, flash memory devices, electrical, optical, or other physical/tangible memory storage devices. Thus, in general, the memory 220 may include one or more tangible (non-transitory) computer readable storage media (e.g., a memory device) encoded with software comprising computer executable instructions and when the software is executed (by the processor 240) it is operable to perform the operations described herein.

Figure 3:
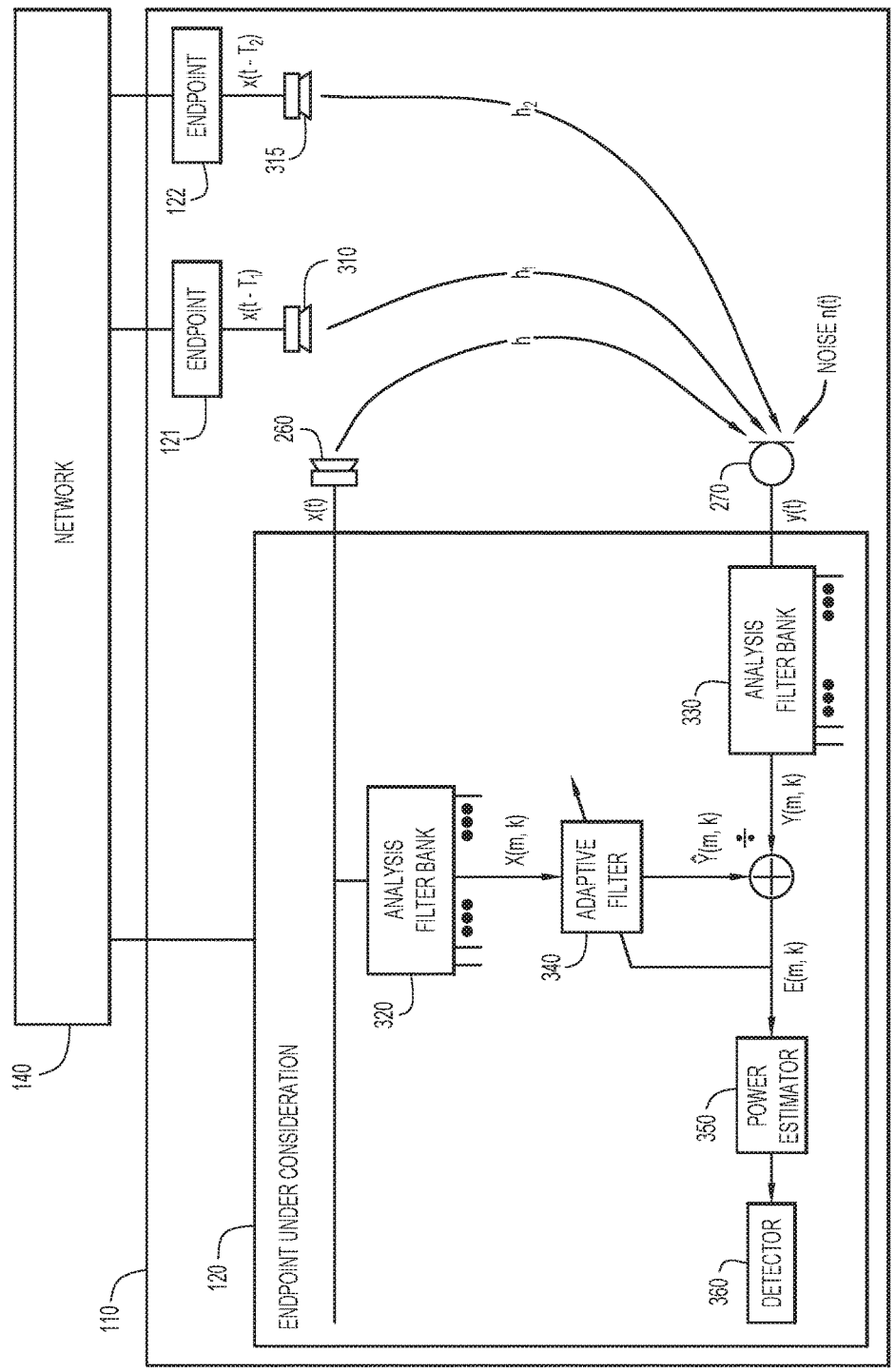
FIG. 3 is a signal processing diagram for motion detection based on ultrasonic signals from a plurality of endpoints with synchronized clocks, according to an example embodiment.

Referring now to FIG. 3, a simplified block diagram illustrates an example of the signal processing in one endpoint of the motion detection system. The endpoints 120, 121, and 122 have synchronized their respective audio sampling clocks via the network 140. The endpoints 120, 121, and 122 transmit an ultrasonic signal into a spatial region via speakers 260, 310, and 315, respectively. With synchronized audio sampling, the signals $x(t)$, $x(t-T_1)$, and $x(t-T_2)$ being transmitted from endpoints 120, 121, and 122, respectively, are referred to herein as identical signals that are transmitted at different times. In other words, endpoint 121 transmits the same periodic signal as endpoint 120, but delayed by a first time delay $T_1$. Similarly, endpoint 122 transmits the same periodic signal as endpoint 120, but delayed by a second time delay $T_2$.

In addition to the speaker 260 and the microphone 270 previously described with respect to FIG. 2, the endpoint 120 under consideration in FIG. 3 includes analysis filter banks 320 and 330, an adaptive filter 340, a power estimator 350, and a detector 360. Analysis filter banks 320 and 330, adaptive filter 340, power estimator 350, and detector 360 represent ultrasonic sound signal processing modules that may be implemented in the endpoint 120. Similar components may be implemented in each of the other endpoints (e.g., endpoints 121 and 122). As will be described in detail below, the detector 360 in the endpoint 120 detects motion in a spatial region (e.g., when people are and are not present in spatial region), and the endpoint 120 may use the detection of motion to perform actions related to the activity in the spatial region, such as selectively waking endpoint 120 or other endpoints when people are present (e.g., have entered the room), controlling lighting or alarms associated with the spatial region, and/or update usage information for the spatial region. The endpoint 120 may perform the aforementioned operations automatically, i.e., without manual intervention. Additionally, the endpoint 120 may perform the operations described herein while the endpoint 120 (or components thereof) is in either an active state or a standby state.

To detect motion in the spatial region 110, the endpoint 120 generates an ultrasonic signal $x(t)$, and provides the ultrasonic signal $x(t)$ to an input of speaker 260. The speaker 260 transmits ultrasonic signal $x(t)$ into the spatial region 110. Ultrasonic signal $x(t)$ has a frequency in an audio frequency range that is generally beyond the frequency range of human hearing, but which can be transmitted from most loudspeakers and picked up by most microphones. This frequency range is generally accepted as approximately 20 kHz and above, however, embodiments described herein may also operate at frequencies below 20 kHz (e.g., 19 kHz) that most people would not be able to hear. As used herein, ultrasonic sound or ultrasonic signals may refer to audio signals that are at a frequency above the hearing range of most human adults (e.g., above 15-17 kHz). The transmitted ultrasonic signal bounces around in the spatial region 110 before it is received and thereby picked up by microphone 270 via an echo path h. Microphone 270 transduces sound received at the microphone into a microphone signal $y(t)$, comprising an ultrasonic echo via the echo path h, ultrasonic signals from nearby endpoints via paths $h_1$ and $h_2$, and background noise $n(t)$. The microphone 270 provides microphone signal $y(t)$ to analysis filter bank 330, which transforms the microphone signal $y(t)$ into a time-frequency domain including multiple ultrasonic frequency subbands $Y(m,k)$ spanning an ultrasonic frequency range. Similarly, analysis filter bank 320 transforms ultrasonic signal $x(t)$ into a time-frequency domain including multiple ultrasonic frequency subbands $X(m,k)$ spanning an ultrasonic frequency range.

In a k'th one of the ultrasonic frequency subbands $X(m,k)$, adaptive filter 340 generates an estimate $Y(m,k)$ of the subband microphone signal Y(m,k), where m denotes a time frame index. The endpoint 120 subtracts the echo estimate $\hat{Y}$(m,k) from the subband microphone signal Y(m,k) output by analysis filter bank 330 to form an error (signal) E(m,k) that is fed back into adaptive filter 340. Adaptive filter coefficients of adaptive filter 340 are adjusted responsive to the fed back error signal. Power estimator 350 may compute a running estimate of the mean squared error (power) |E(m,k)|^2 of the error signal E(m,k), which enables the detector 360 to detect motion in the spatial region 110, e.g., when somebody walks into the room where nobody has been for a while, based on the estimated power.

The detector 360 receives the power estimates of the error signal and detects motion based on the power estimates. In one example, as soon as a person enters the spatial region 110, the power estimate of the error signal will change from a relatively small level to relatively large level. Thus, detection may be performed by comparing the power estimate of the error signal over time with a threshold that may be set, for example, to a few dBs above the steady-state power (e.g., the steady-state power is the power corresponding to when adaptive filter 340 is in a converged state, such that the threshold is indicative of the steady-state or converged state of the adaptive filter), or, if a running estimate of the variance of the power signal is also computed, to a fixed number of standard deviations above the steady-state power. In another example, the endpoint 120 estimates a statistical model of the power signal, and bases the decision on likelihood evaluations. It may be desirable to design adaptive filter 340 for deep convergence instead of fast convergence. This is a well-known tradeoff that can be controlled in stochastic gradient descent algorithms like normalized least mean squares (NLMS) with a step size and/or a regularization parameter.

Ultrasonic signal x(t) may be an ultrasonic signal that is dedicated to the task of detecting motion, or an existing ultrasonic signal, as long as endpoint 120 is able to generate and transmit the ultrasonic signal while the endpoint is asleep, i.e., in a standby mode. Best performance may be achieved when ultrasonic signal x(t) is stationary and when there is minimal autocorrelation of the non-zero lags of the subband transmitted loudspeaker signal. The correlation matrix $R_{X_k}$ of ultrasonic subband signal X(m,k) may be used to a certain degree to control the relative sensitivity of the people presence detection to the adaptive filter mismatch and the local sound from within the room.

In one example, each of the endpoints that are synchronized (e.g., endpoints 120, 121, and 122) emit an identical ultrasonic signal x, which is periodic with period P. The sampling clock synchronization ensures that the ultrasonic signal is identical, though the playout of the signals need not be time synchronized across the endpoints. For instance, each endpoint may start to transmit the ultrasonic signal x(t) as each endpoint boots and powers up. Since the signal is periodic with period P, each endpoint plays out a signal x(t-$T_i$), where $T_i$<P, as a delayed version of the signal x(t) played from the endpoint under consideration (e.g., endpoint 120).

In another example, the performance of the motion detection system may be optimized by selecting a period P that is at least as large as the maximum expected ultrasonic room reverberation time plus the delay in playout and capture. Experience with ultrasonic detection systems suggests that a period P of 150 milliseconds is sufficient for most deployments of the motion detection system. Additionally, the motion detection system may further optimize the system by selecting a persistent and dense ultrasonic signal x(t), such as bandpass-filtered white noise.

In a further example, each endpoint runs prediction-based motion detection as described herein using a single-channel echo canceller comprising one or more adaptive filters. However, rather than adapting to the ultrasonic part of the impulse response captured at the microphone 270 from the speaker 260, the adaptive filter 340 adapts to the ultrasonic part of a sum of different impulse responses (e.g., transmitted from endpoints 121 and 122). The sum of the impulse responses includes 1) the impulse response from speaker 260 to microphone 270 on the endpoint 120 (i.e., path h), and 2) the cross-endpoint impulse responses from the speakers 310 and 315 of interfering endpoints 121 and 122 to the microphone 270 of the endpoint 120 (i.e., the paths $h_1$ and $h_2$), delayed by arbitrary time delays $T_1$ and $T_2$. In other words, the adaptive filter adapts to $h(t')+\Sigma h_i(t'-T_i)$, where t' denotes the independent variable or discrete-time index.

The length of the adaptive filter 340 (i.e., the number of filter coefficients) may be selected in order to capture most of the ultrasonic energy in the sum. For instance, the length may be selected to include the sum of the periodic signal (e.g. 150 ms), the latency in playback/capture (e.g., 30-40 ms), the maximum expected acoustic delay between endpoints (e.g., about 100 ms for endpoints that are 34 meters apart), and the maximum expected ultrasonic room reverberation (e.g., 120 ms). For typical deployments of the motion detection system, a filter length of approximately 400 ms may be selected to capture most of the ultrasonic energy.

Since the strongest ultrasonic signals captured by the microphone 270 contribute most to the sensitivity of the motion detection logic at the endpoint 120, motion near the endpoint 120 is most easily detected. Motion between other nearby endpoints (e.g., endpoints 121 and 122) and the endpoint 120 will also be easily detected. Endpoints that are very far away from the endpoint 120 (e.g., outside the spatial region 110) contribute minimal amounts of the energy captured at the microphone 270, enough to ensure high sensitivity to motion throughout the spatial region 110. However, motion far from the endpoint 120 but near other synchronized endpoints is not likely to trigger detection in endpoint 120 since the change in microphone energy captured at the endpoint 120 is relatively small.

In one example, a remote endpoint (e.g., endpoint 121) may create a false positive detection at the endpoint 120 when the remote endpoint loses power or needs to be rebooted (e.g., for software upgrades). The remote endpoint stops playing the ultrasonic signal, and restarts playing the ultrasonic signal after rebooting (e.g., after about a minute). The endpoint 120 may detect the decrease in energy from the remote endpoint stopping playback of the ultrasonic signal. Such a level decrease does not cause the endpoint 120 to detect motion, since detection is only triggered for an increase in level. However, when the remote endpoint resumes playing the ultrasonic signal, the endpoint 120 may detect this increase in energy, triggering a false positive motion detection. This false positive event may be mitigated by instructing each of the endpoints to gradually increase the transmission power of the ultrasonic signal on booting up the endpoint. The increase in detected energy may then be sufficiently gradual that the adaptive filter adapts to the changing signal quickly enough to keep the error signal below the predetermined threshold for motion detection.

Figure 4:
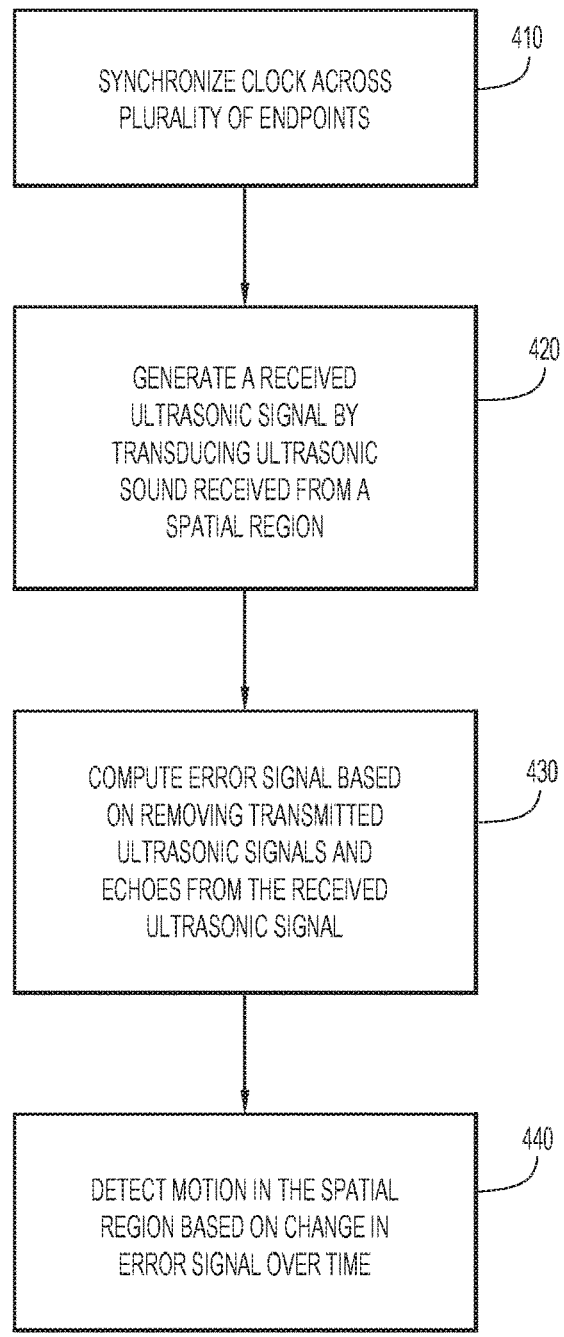
FIG. 4 is a flowchart of a motion detection process by an endpoint, according to an example embodiment.

Referring now to FIG. 4, a flowchart describes a process 400 by which an endpoint (e.g., endpoint 120) detects motion based on signals from a plurality of synchronized endpoints transmitting identical ultrasonic signals. At 410, a first endpoint among a plurality of endpoints synchronizes a clock across the plurality of endpoints. In one example, the clocks are synchronized using PTP to sub-microsecond accuracy. At 420, the first endpoint generates a received ultrasonic signal by transducing ultrasonic sound received at a microphone from a spatial region. The ultrasonic sound includes an identical ultrasonic signal transmitted from each of the plurality of endpoints and echoes from the spatial region. The identical ultrasonic signal is generated with respect to the synchronized clock, e.g., a synchronized audio sampling clock.

At 430, the first endpoint computes an error signal based on removing the identical ultrasonic signals and echoes from the spatial region. In one example, the first endpoint includes an adaptive filter to generate a predicted ultrasonic signal and compares the predicted ultrasonic signal to the received ultrasonic signal to generate the error signal. At 440, motion is detected in the spatial region based on a change in the error signal over time. In one example, motion is detected when the error signal increases by a predetermined amount over a predetermined threshold.

The techniques presented herein provide a simple, computationally cheap, and highly scalable method for motion detection using endpoints in a crowded environment. Robustness with multiple endpoints in a shared space is achieved with audio sampling clock frequency synchronization, simultaneous playout of a persistent and dense periodic ultrasound signal from all of the endpoints, and ultrasonic-based motion detection using statistical prediction.

In one form, a method is provided. The method comprises, at a first endpoint among a plurality of endpoints, synchronizing a clock across the plurality of endpoints. The method also comprises generating a received ultrasonic signal by transducing ultrasonic sound received at a microphone from a spatial region. The ultrasonic sound includes an identical ultrasonic signal transmitted from the plurality of endpoints and echoes from the spatial region. The identical ultrasonic signal is generated with respect to the synchronized clock. The method further comprises computing an error signal based on removing the identical ultrasonic signals and the echoes from the received ultrasonic signal. The method also comprises detecting motion in the spatial region based on a change in the error signal over time.

In another form, an apparatus comprising a network interface, a speaker, at least one microphone, and one or more processors coupled to a memory. The network interface is configured to communicate with a plurality of endpoints. The speaker is configured to transmit ultrasonic signals into a spatial region. The microphone is configured to receive ultrasonic sound from the spatial region. The processor is configured to synchronize a clock across the plurality of endpoints via the network interface. The processor is also configured to generate a received ultrasound signal by transducing the ultrasonic sound received at the microphone. The ultrasonic sound includes an identical ultrasonic signal transmitted from each of the plurality of endpoints and echoes from the spatial region. The identical ultrasonic signal is generated with respect to the synchronized clock. The processor is further configured to compute an error signal based on removing the identical ultrasonic signals and the echoes from the received ultrasonic signal. The processor is also configured to detect motion in the spatial region based on a change in the error signal over time.

In a further form, a system of a plurality of endpoints is provided. The system includes a plurality of endpoints in a spatial region. Each particular endpoint is configured to synchronize a clock across the plurality of endpoints. Each particular endpoints is also configured to generate a received ultrasonic signal by transducing ultrasonic sound received at a microphone from the spatial region. The ultrasonic sound includes an identical ultrasonic signal transmitted from each of the plurality of endpoints and echoes from the spatial region. The identical ultrasonic signal is generated with respect to the synchronized clock. Each particular endpoint is further configured to compute an error signal based on removing the identical ultrasonic signals and the echoes from the received ultrasonic signal. Each particular endpoint is also configured to detect motion in the spatial region based on a change in the error signal over time.

In yet another form, one or more non-transitory computer readable storage media are provided to cause a processor to perform the methods described herein.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a first endpoint among a plurality of endpoints, synchronizing a clock across the plurality of endpoints;
   generating a received ultrasonic signal by transducing ultrasonic sound received at a microphone from a spatial region, the ultrasonic sound including an identical ultrasonic signal transmitted from each of the plurality of endpoints and echoes from the spatial region, wherein the identical ultrasonic signal is generated with respect to the synchronized clock;
   computing an error signal based on removing the identical ultrasonic signals and the echoes from the received ultrasonic signal; and
   detecting motion in the spatial region based on a change in the error signal over time.

2. The method of claim 1, wherein computing the error signal comprises:
   adaptively filtering the received ultrasonic signal based on a set of filter coefficients for a single adaptive filter to generate an estimate of the identical ultrasonic signals and the echoes; and
   comparing the estimate with the received ultrasonic signal to generate the error signal.

3. The method of claim 1, wherein the identical ultrasonic signal is periodically retransmitted at a predetermined interval of time.

4. The method of claim 3, wherein the predetermined interval of time is based on acoustic properties of the spatial region.

5. The method of claim 1, further comprising transmitting the identical ultrasonic signal at the first endpoint at a different start time than the identical ultrasonic signals transmitted from a remainder of the plurality of endpoints.

6. The method of claim 1, further comprising, after the first endpoint reboots, gradually increasing a transmission power of the identical ultrasonic signal at a rate that keeps the change in the error signal below a predetermined threshold.

7. The method of claim 1, further comprising waking at least the first endpoint from a standby state based on detecting motion in the spatial region.

8. An apparatus comprising:
- a network interface configured to communicate with a plurality of endpoints;
- a speaker configured to transmit ultrasonic signals into a spatial region;
- at least one microphone configured to receive ultrasonic sound from the spatial region; and
- one or more processors coupled to a memory, wherein the one or more processors are configured to:
  - synchronize a clock across the plurality of endpoints via the network interface;
  - generate a received ultrasonic signal by transducing the ultrasonic sound received at the at least one microphone, the ultrasonic sound including an identical ultrasonic signal transmitted from each of the plurality of endpoints and echoes from the spatial region, wherein the identical ultrasonic signal is generated with respect to the synchronized clock;
  - compute an error signal based on removing the identical ultrasonic signals and the echoes from the received ultrasonic signal; and
  - detect motion in the spatial region based on a change in the error signal over time.

9. The apparatus of claim 8, wherein the one or more processors are configured to compute the error signal by:
- adaptively filtering the received ultrasonic signal based on a set of filter coefficients for a single adaptive filter to generate an estimate of the identical ultrasonic signals and the echoes; and
- comparing the estimate with the received ultrasonic signal to generate the error signal.

10. The apparatus of claim 8, wherein the identical ultrasonic signal is periodically retransmitted at a predetermined interval of time based on acoustic properties of the spatial region.

11. The apparatus of claim 8, wherein the one or more processors are further configured to cause the speaker to transmit the identical ultrasonic signal at a different start time than the identical ultrasonic signals transmitted from the plurality of endpoints.

12. The apparatus of claim 8, wherein, after the apparatus reboots, the one or more processors are further configured to cause the speaker to slowly increase a transmission power of the identical ultrasonic signal at a rate that keeps the change in the error signal below a predetermined threshold.

13. The apparatus of claim 8, wherein the one or more processors are further configured to wake the apparatus from a standby state based on detecting motion in the spatial region.

14. A system comprising:
- a plurality of endpoints in a spatial region, wherein each particular endpoint in the plurality of endpoints is configured to:
  - synchronize a clock across the plurality of endpoints;
  - generate a received ultrasonic signal by transducing ultrasonic sound received at a microphone from the spatial region, the ultrasonic sound including an identical ultrasonic signal transmitted from each of the plurality of endpoints and echoes from the spatial region, wherein the identical ultrasonic signal is generated with respect to the synchronized clock;
  - compute an error signal based on removing the identical ultrasonic signals and the echoes from the received ultrasonic signal; and
  - detect motion in the spatial region based on a change in the error signal over time.

15. The system of claim 14, wherein each particular endpoint is configured to compute the error signal by:
- adaptively filtering the received ultrasonic signal based on a set of filter coefficients for a single adaptive filter to generate an estimate of the identical ultrasonic signals and the echoes; and
- comparing the estimate with the received ultrasonic signal to generate the error signal.

16. The system of claim 14, wherein each of the plurality of endpoints is configured to periodically retransmit the identical ultrasonic signal at a predetermined interval of time.

17. The system of claim 16, wherein the predetermined interval of time is based on acoustic properties of the spatial region.

18. The system of claim 14, wherein at least one of the plurality of endpoints is configured to transmit the identical ultrasonic signal at a different start time than the identical ultrasonic signals transmitted from a remainder of the plurality of endpoints.

19. The system of claim 14, wherein, after rebooting, each of the plurality of endpoints is configured to gradually increase a transmission power of the identical ultrasonic signal at a rate that keeps the change in the error signal below a predetermined threshold.

20. The system of claim 14, wherein at least one of the plurality of endpoints is configured to wake from a standby state based on detecting motion in the spatial region.

* * * * *